Jan. 2, 1923.  
E. J. TOMLINSON.  
CIRCUIT CONTROLLER AND CURRENT REGULATOR.  
FILED MAY 29, 1916.  
1,441,044.  
2 SHEETS—SHEET 1.
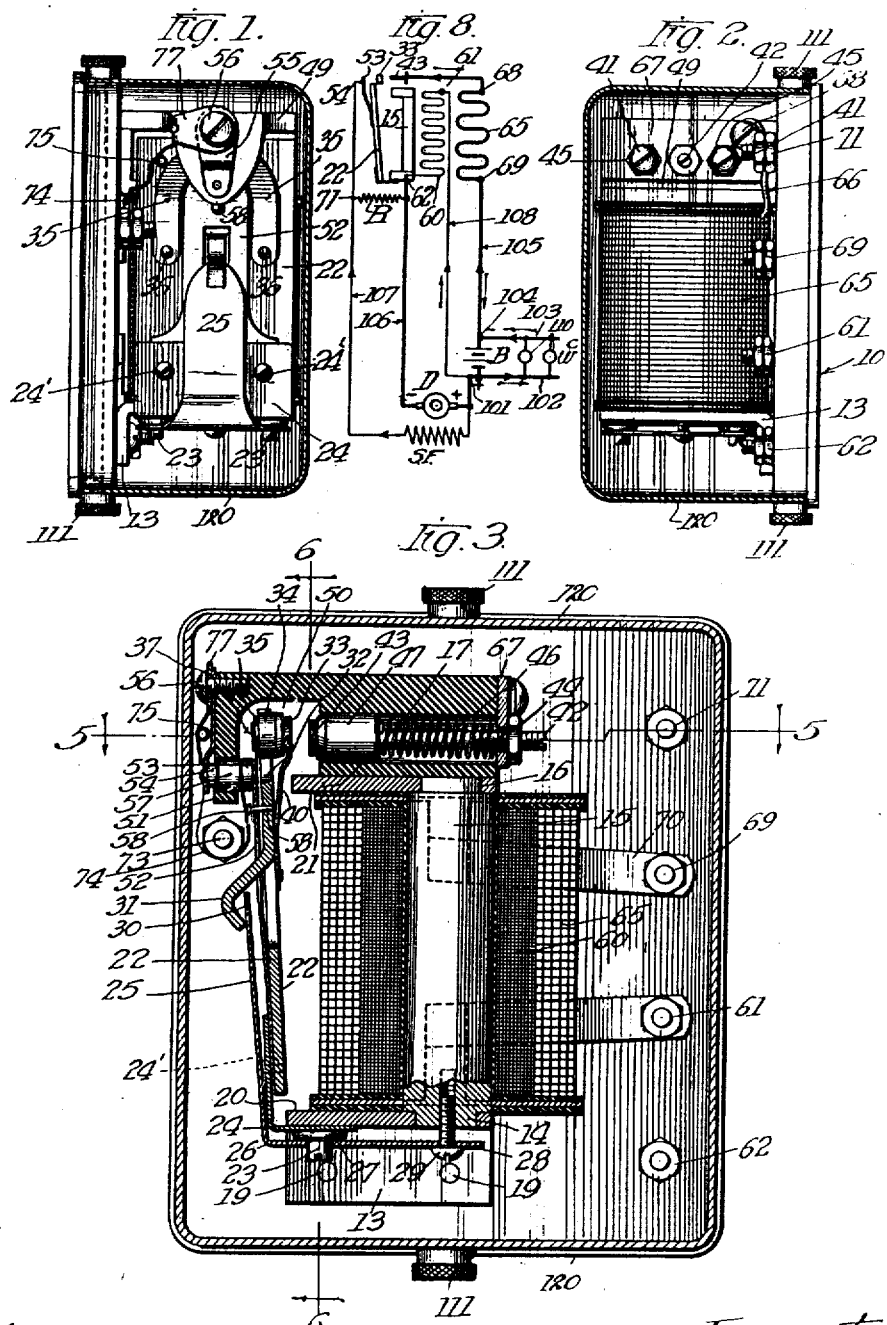

Jan. 2, 1923.
E. J. TOMLINSON.
CIRCUIT CONTROLLER AND CURRENT REGULATOR.
FILED MAY 29, 1916.
1,441,044.
2 SHEETS—SHEET 2.
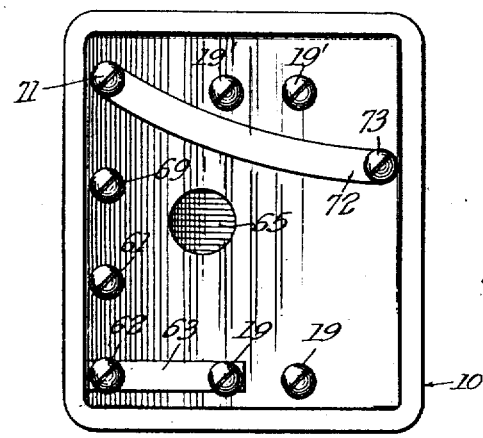
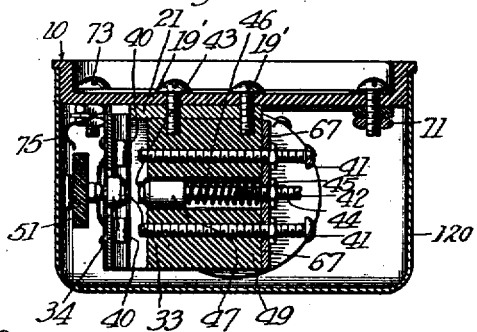
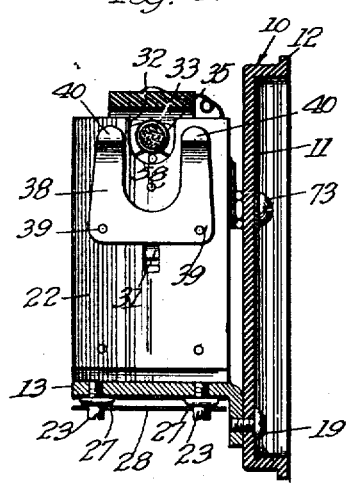
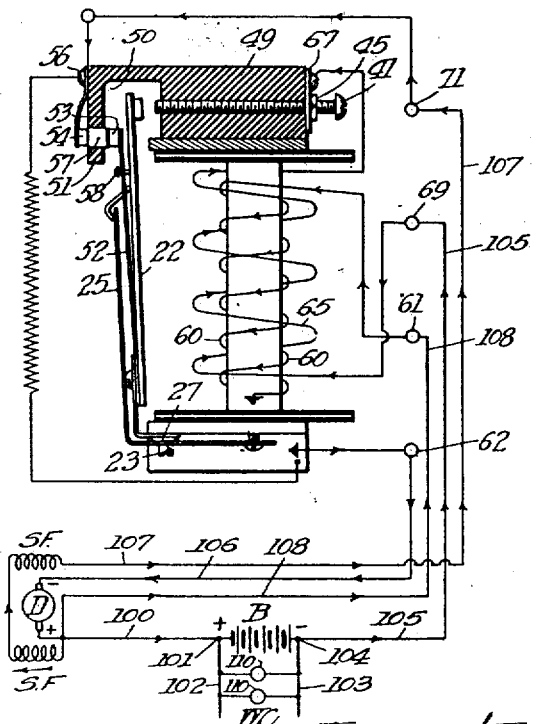
Witnesses:
Robert H. Wein
Arthur W. Carton
Inventor
Edward J. Tomlinson
Foree Bain May
Attys Patented Jan. 2, 1923.

1,441,044

UNITED STATES PATENT OFFICE.

EDWARD J. TOMLINSON, OF NEWARK, NEW JERSEY, ASSIGNOR, BY DIRECT AND MESNE ASSIGNMENTS, TO WARD LEONARD ELECTRIC COMPANY, A CORPORATION OF NEW YORK.

CIRCUIT CONTROLLER AND CURRENT REGULATOR.

Application filed May 29, 1916. Serial No. 100,567.

*To all whom it may concern:*

Be it known that I, EDWARD J. TOMLINSON, a citizen of the United States, residing at Newark, in the county of Essex and State of New Jersey, have invented certain new and useful Improvements in Circuit Controllers and Current Regulators, of which the following is a specification.

My invention relates to improvements in circuit-controllers and current-regulators.

One of the objects of my invention is to incorporate, in a single instrument, means for controlling the circuit between a dynamo-electric generator and a storage battery to be charged thereby when they are associated to jointly supply current to a given working circuit; to automatically switch the generator in circuit with the battery, and other electrical translating devices, when the electro-motive force of the dynamo or generator sufficiently exceeds that of the battery and to automatically reduce the excessive electro-motive force of the generator, upon increase of speed, by periodically varying the ampere-turns of the energizing coils of the field magnet winding, whereby to prevent dangerous increase of current flowing from the generator.

Other, further and more specific objects of my invention will become readily apparent, to persons skilled in the art, from a consideration of the following description when taken in conjunction with the drawings, wherein:—

Fig. 1 is a side elevation of the instrument, showing the enclosing case in section.

Fig. 2 is a similar view showing the opposite side of the instrument.

Fig. 3 is an enlarged section taken on a central vertical plane.

Fig. 4 is a bottom view of the base.

Fig. 5 is a section taken on line 5—5 of Fig. 3, showing the top part of the instrument.

Fig. 6 is a section taken on line 6—6 of Fig. 3.

Fig. 7 is a diagrammatic view showing the connections between the dynamo, battery, working circuit and with the instrument.

Fig. 8 is a simplified form of diagram more clearly showing the relative positions of the parts of the controlling mechanism.

In all the views the same reference characters are employed to indicate similar parts.

I will first describe the parts of the instrument in their relation and operation and then explain its use and the manner of its connection with a dynamo and battery.

10 is a base, having a raised bottom 11 and a marginal flange 12 to provide a hollow interior within which to contain the electrical connections and screws.

The base is of insulating material, such as bakelite, or the like, or of any other suitable material. Mounted upon the base 10 is a bracket 13 of para-magnetic material to which is connected at one side, as at 14, an electro-magnetic core 15, of the electro-magnet. The core 15 is connected at its other end, as at 16, to another bracket 17 of para-magnetic material. These brackets are secured to the base, as by screws 19 and 19', respectively. The parts 20 and 21 of the brackets 13 and 16, respectively, form the pole pieces of the electro-magnet for inductively effecting the vibration of the armature 22. Secured to the bracket 13, as by screws 23, is a piece of sheet spring bronze 24, which is bent at substantial right angles, and secured to the armature, as by screws 24'. The piece 24 forms a pivotal connection for the armature 22 with the relatively stationary pole piece or bracket 13, and permits the armature to be freely vibrated by the varying magnetic condition of the electro-magnet. The armature 22 is held in retracted position by a sheet steel or bronze tongue 25, which is bent at right angles, as at 26, and which overlies the heads of the screws 23—23, being separated from the spring hinge piece 24 by washers 27—27. The screw heads 23, 23 serve as guides for the tongue 25. The tongue piece 25 is prolonged, as at 28, and near this end is provided with a bore to receive a screw 29. The screw 29 is adjustable in the core 15 of the electro-magnet, as a means for increasing and decreasing the tension of the spring tongue 25 and its effect upon the armature 22. The forward end 30, of the tongue 25, underlies a tongue 31 which is sprung out from the surface of the armature, as a convenient means of attachment between the spring tongue 25 and the armature. Turning the screw 29 inwardly will increase the resilient tension of the tongue 25 and hold the armature 22 more strongly against the attractive force of the electro-magnet. The movement of the screw 29 in the opposite direction has, of course, the reverse effect. Adjustment of the tension of spring 25 may also be effected by bending tongue 31 as with a pair of pliers. The free end of the armature 22 is cut away, as at 32, to permit the passage of an electrical contact 33. The contact member 33 is preferably of carbon and is contained in a cup of brass, or the like, 34. A U-shaped spring 35, made of sheet metal, such as phosphor bronze, steel or the like, is secured to the armature 22, as at 36, and is secured to the cup 34, as at 37. The spring 35 permits the yielding movement of the contact 33, when it is brought into impact connection with a similar cooperating connection. On the opposite side of the armature 22, as shown in Fig. 6, is another U-shaped piece 38 secured to the armature, as at 39, and provided with two resilient fingers 40—40, one on each side of the contact 33. These fingers bear upon adjustable screws 41—41. The screws 41 are adjustable toward and from the springs 40 to interpose more or less additional resistance to the movement of the armature 22 to supplement that provided by the resilient tongue 25. An axially movable stem 42, carries an electric contact 43, for cooperation with the contact 33 on the armature 22. The stem 42 is threaded, as at 44, for an adjustable nut 45, which acts as a stop to limit the inner movement of the contact 43. An open helical spring 46, surrounds the stem 42, and bears against the inner end of the cylinder 47, that is attached to the stem 42 and which directly carries the contact 43. A block of insulating material 49 which is held in place by the screws 19'—19', is cut away, as at 50, to provide an over-hanging arm 51. The free end of the armature 22 plays in the space 50. Fixed to the armature 22 is another spring tongue 52, as by the screws 24'. This tongue carries, on its outer end, an electrical contact 53. Another contact 54 is secured to an arm 55 that is fixed to the block of insulating material 49 by a screw 56. Between the contacts 53 and 54, is an intermediate axially movable or floating contact 57, which normally connects the contacts 53 and 54, the object of which will be hereinafter more fully described. A headed pin 58 passes loosely thru the tongue 52 and is secured in the armature 22, the object of which is to permit some limited relative movement of the armature 22 toward the magnet before the tongue 52 is moved thereby by operation of the head of the pin.

Coil 60, of relatively fine wire, is connected to the frame or "grounded" portion 13 of the electro-magnet and to the binding post 61. The frame 13 and the binding post 62 are connected together by a strap 63. A relatively coarse wire coil 65, made of wire sufficiently large to carry the maximum current that is to be generated by the dynamo, has one of its ends 66, connected to the plate 67, to which the contact 43 is connected by the stem and spring, as by screw 68. The other terminal of the coil 65 is connected to the binding post 69, as by the strap 70. The binding post 71 is connected by a strap 72, in the bottom of the base, to the screw 73, which carries a fuse clip 74 for the fuse 75. The fuse is also connected to the clip 77 that lies under the screw 56.

A resistance coil R is connected substantially between the binding posts 71 and 62, for inclusion in series with the field winding of a dynamo and which normally bridges the contacts 53 and 54, and the gap therebetween, when the armature 22 is vibrated. When the contacts 53 and 54 are closed, or are in electrical connection with each other, thru the floating contact 57, the resistance R is thereby short-circuited, and when these contacts are open the resistance R is cut into the circuit, in series with the shunt field windings of the dynamo.

In the diagrams of circuits, D is the dynamo-electric machine having the shunt field winding SF. The positive terminal of the dynamo is connected by wire 100 to the battery B, as at 101, from which point the working circuit WC starts, by the wire 102 terminating in the wire 103, which is connected to the negative terminal of the battery, as at 104. Wire 105 connects the negative side of the battery to the binding post 69 of the switch. The binding post 69 is one terminal for the coil 65.

The arrows in the lines representing wires of the circuits indicate the direction of flow of current from the dynamo.

The negative terminal of the dynamo is connected by wire 106 to the binding post 62 of the controller and regulator. The shunt field winding, SF, is connected to the positive terminal of the dynamo D, and by wire 107 to the binding post 71. The wire 108 is connected to the positive side of the dynamo, or to the wire 100 between the battery B and the dynamo, and to the binding post 61.

Translating devices 110, such as electric lamps or the like, are connected in the working circuit between wires 102 and 103.

Normally the coil 60 is in closed circuit with the armature of the dynamo, over the wires 106 and 108, and the dynamo shunt field circuit is completed over the wires 107 and 106, the resistance R being normally short circuited by the contacts 53 and 54, when the armature is retracted.

When the electro-motive force of the dynamo is greater than that of the battery, the armature 22 is sufficiently attracted to cause the contacts 33 and 43 to be brought into electrical connection, closing the circuit thru the battery and the coil 65 and adding to the magnetic effect of the electro magnet. The initial movement of the armature closes the contacts 33 and 43. The spring 52, carrying the contact 53, permits considerable attractive movement of the armature 22 before connection is broken between contacts 53 and 54. When connection is made between contacts 33 and 43 current will then flow from the dynamo, thru the battery and over the wire 105, thru the coil 65, and thru the contacts 43 and 33, over the wire 106 back to the dynamo, thus supplementing the initial magnetic effect produced by the coil 60. Now should the electro-motive force of the dynamo rise above normal, the current will tend to correspondingly increase, then the armature 22 will be further attracted by the augmented magnetic effect produced by the coils 60 and 65, until connection is broken between the contacts 53 and 54, whereupon the resistance R is thereby admitted into series relation with the shunt field windings of the dynamo thus reducing the ampere turns of the field magnet of the dynamo thereby decreasing its electro-motive force and consequently the current. As the speed of the dynamo increases, the intensity of vibration between the contacts 53 and 54 increases, thereby prolonging the time that the resistance R is included in the shunt field windings of the dynamo, and correspondingly prolonging the time that the current thru such windings or the ampere-turns thereof are reduced. The vibration of the armature, to open and close the contacts 53 and 54 begins only when the charge-rate of the dynamo has been exceeded and is maintained to a varying degree as the speed of the dynamo is increased above normal. The result is that the effect of the included resistance R to increase the resistance of the field windings or to decrease the ampere-turns thereof, is substantially proportional to the vibrating effect of the armature 22.

The contact 33, being supported upon the yielding spring 35, permits some relative movement of the armature and the contact 43 being supported upon the stem 42, which is yieldingly held in inward position against the nut 42, by means of the spring 46, permits further relative movement of the armature 22 with reference to these contacts, so that after connection has been established between the contacts 33 and 43, the armature may be further moved by the effect of the electro-magnet while said connection is preserved, to break the circuit between the contacts 53 and 54.

Intermediate the contacts, 53 and 54, is a floating connecting contact 57. The floating contact 57 is placed between the contacts 53 and 54 to remedy the effect produced by or to prevent sticking of the contacts. When the armature 22 is vibrated there is a tendency for the contacts to stick. If, for instance, contacts 53 and 57 were to stick, or "freeze" together, the circuit would still be opened and closed by the vibration of the armature, between contacts 57 and 54, and the constant subsequent vibration of the contacts 53 and 57 would tend to loosen contacts 53 and 57. If perchance the contacts 54 and 57 were to stick together, then the connection between 53 and 57 would still be effected by the now loosened contacts by the motion of the armature 22. It may be observed that after the circuit has been opened and closed between two of the relatively vibrating contacts, that they will be heated by the heat produced by the incipient arcs formed between the vibrating contacts, the tendency being to soften the metal of the contact points causing adhesion of the parts. After the heat has disappeared they are more easily separated, while, in the meantime, with my improved contacting means in which a plurality or series of contacts are associated, the opening and closing of the circuit between a given pair of contacts, being suspended for the reason described, the other pair will be brought into effective operation, so that there is always the desired effect produced by one pair of the plurality of contacts.

By the use of the instrument described, the dual operation of cutting into the circuit the storage battery, when the dynamo has attained a predetermined electro-motive-force, is accomplished, and by the further movement of the same armature, which accomplishes this result, the regulation of the dynamo is effected to produce substantially a constant current irrespective of the speed at which the dynamo is being driven. Such an arrangement is especially valuable in connection with an electric plant installed upon an automobile wherein a dynamo-electric machine is operated from an engine of inconstant speed, thereby doing away with more complicated speed-governing devices in an effort to maintain constant speed and constant electro-motive force of the armature of the dynamo irrespective of the varying speed of the engine.

The instrument may be covered by a casing 120 secured in place by thumb screws 111.

Having described my invention, what I claim is:—

1. In a device of the character described, a vibratory member carrying a contact yieldingly supported thereon; a relatively stationary co-operating contact and an intermediate axially movable contact for co-operation with either or both associate contacts.

2. In a device of the character described, a vibrating member carrying a contact; a relatively stationary co-operating contact, a support with a hole therethrough, and an intermediate, axially movable, freely slidable contact in said hole for cooperation with either or both associate contacts between which and either of the other contacts circuit may be opened and closed by said vibrating member.

3. In an automatic regulator and cutout, an electro-magnet, an armature therefor, back contacts associated with the armature for the regulator and an interposed floating contact member between said back contacts.

In testimony wherof I hereunto set my hand in the presence of two subscribing witnesses.

EDWARD J. TOMLINSON.

In the presence of:—
H. E. BORGER,
J. A. RYAN.